Oct. 10, 1933. I. N. CASSITY 1,930,306
REFLECTING BIOSCOPE ATTACHMENT FOR OPTICAL INSTRUMENTS
Filed Jan. 25, 1932
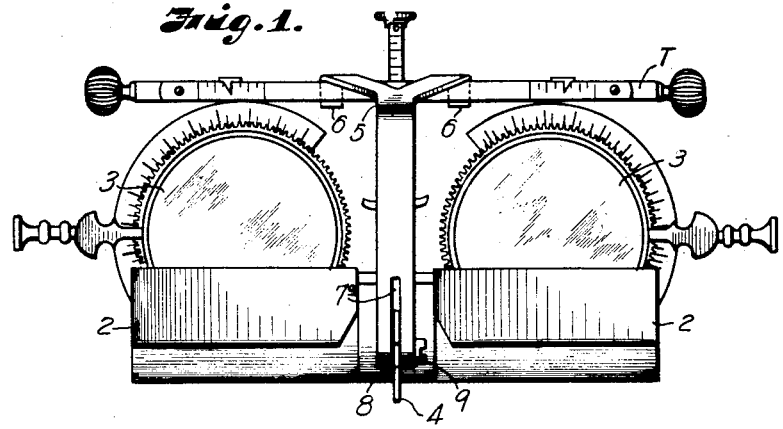
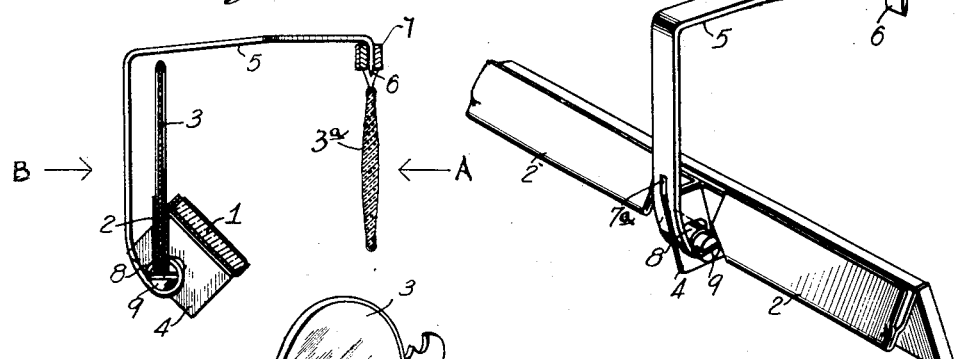
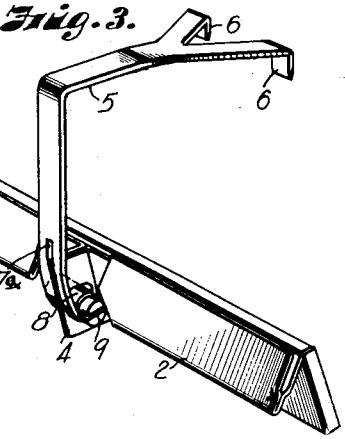
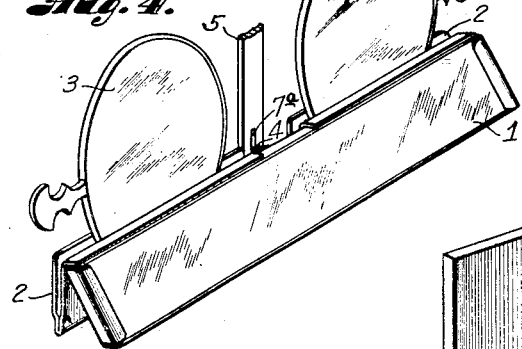
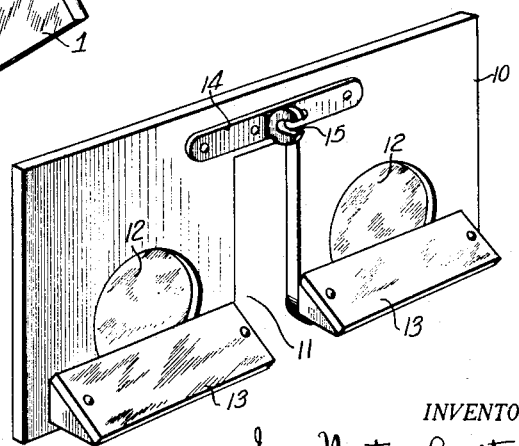
INVENTOR.
Isaac Newton Cassity,
BY Thorpe&Thorpe,
ATTORNEYS.

Patented Oct. 10, 1933

1,930,306

UNITED STATES PATENT OFFICE 1,930,306

REFLECTING BIOSCOPE ATTACHMENT FOR OPTICAL INSTRUMENTS

Isaac Newton Cassity, Topeka, Kans.

Application January 25, 1932. Serial No. 588,662

4 Claims. (Cl. 88—20)

This invention relates to a reflecting bioscope attachment for optometrists' use in connection with optometers, trial frames, and the like, or in any case where objective examination of the eyes, while focused on a point of known distance away, is desired.

In present practice it is customary for the patient to view a chart or display stationed a predetermined distance, and the lenses before the patient's eyes are changed, either through the substitution of lenses in the trial frame or through the rotation of the wheel or member carrying the trial lenses, if an optometer is used, and the optometrist, usually working from a distance of about twenty six inches, examines the eyes with a retinoscope to see if the image or shadow can be neutralized through the trial lenses before the eyes of the patient. It is necessary for the proper functioning of the retinoscope that additional or working lenses, usually of 1.50 diopters, when the working distance is about twenty six inches, be interposed in the patient's line of vision. It will be understood, in this connection, that the power of the working lenses is chosen in accordance with the distance from which the optometrist is using the retinoscope.

With the above standard method of operation it is found that only one eye of a patient is actually focused on the chart, if static retinoscopy or skimetry is used, as the operator's head and the retinoscope, are invariably interposed more or less in the line of vision, and that there is a further disadvantage inasmuch as the patient is looking through the working lenses and his vision is blurred which hinders accurate work and inasmuch as the power of the working lens must be subtracted from the power of the trial lenses to obtain the proper prescription for the eyes of the patient, and if care is not exercised in this respect, it is possible that the lenses will be inaccurately prescribed.

One of the objects of the present invention, therefore, is to avoid the above disadvantages by taking the working lenses outside of the line of vision of the patient, making it possible for the patient to see the chart clearly without obstruction of the working lenses, and the optometrist to read the prescription direct from the optometer settings or from the trial lenses, and to make it possible for the optometrist to objectively examine the eyes without in any manner interfering with the simultaneous focus of both eyes of the patient on the chart, thus making it possible to more accurately test the patient's eyes as it is well known that the eyes mutually affect each other, and that the present method of, in effect, testing one eye at a time because of the interference with the vision or blur of the working lenses, necessarily results in some degree of inaccuracy.

The prime object of the invention is accomplished by providing a mirror or reflector arranged to reflect a chart, for example, placed overhead, while the working lenses used by the optometrist are in such position that he may work directly in front of the patient without in any way interfering with or interrupting the simultaneous cooperative focus of both eyes on the distant chart. With this method of operation, it will be readily apparent that a more accurate prescription may be secured, as the mutual effect of the eyes one on the other, when focused at the distant chart, is not interfered with in any way.

With the general objects named in view and others as will hereinafter appear, the invention consists in certain novel and useful features of construction and combinations of parts as hereinafter described; and in order that it may be fully understood, reference is to be had to the accompanying drawing, in which:—

Figure 1 is a front view of a trial frame equipped with a device embodying the invention.

Figure 2 is a section through one side of the trial frame and the device embodying the invention.

Figure 3 is a rear perspective view of the device of the invention with the working lenses omitted.

Figure 4 is a front perspective view of the device of the invention with the working lenses in operative position.

Figure 5 is a modified construction suitable for attachment to any type of optometer.

In the said drawing, where like reference characters identify corresponding parts in all of the figures, 1 indicates a mirror or reflector of sufficient length to accommodate the maximum space between patients' eyes, said reflector being shown as one piece, although it will be apparent that it may be made in two pieces as shown in Figure 5, and is held in a frame formed with a pair of similar lens receiving pockets 2, of sufficient length to permit the axes of the working lenses 3 to be alined with the axes of the trial lenses 3a of the optical instrument. The pockets 2 and the mirror 1, are so angularly arranged that the working lenses 3 shall be parallel to the trial lenses 3a, and this angle, where a chart or the like is to be reproduced on an overhead support in a plane at right angles to the plane of the trial lenses, is preferably 45 degrees, but obviously the angle will vary if the chart is to occupy some other relation to the plane of the trial lenses.

In the construction illustrated, the pockets 2 are cut away midway their length, and the frame is formed with a rearwardly projecting securing flange 4.

To mount the reflecting dioscope mechanism on a trial frame, 5 indicates a generally L-shaped bracket bifurcated at one end and terminating in a pair of securing hook members 6 to detachably engage a trial frame 7, the other end of said bracket 5 extending downwardly and having its end slotted at 7a to receive flange 4 of the reflector frame. The lower end of frame 5 terminates in a tapped boss 8 to receive a securing screw 9 passing therethrough, and through an opening in the flange 4, so that the mirror or reflector and the trial lenses 3 may be adjustable with relation to the trial frame 7.

In the use of the device, the patient looks through the trial lenses 3a, in the direction of the arrow A (Figure 2), at the reflector 1 arranged to reflect a chart on an overhead surface; while the optometrist objectively examines the eyes of the patient with a retinoscope or other instrument, in the direction of the arrow B (Figure 2), through the working lenses 3, it being apparent that the patient has uninterrupted vision with both eyes at the chart and that the procedure by the optometrist, does not interfere with the mutual affect of the eyes when so focused. Thus, the prescription for the patients' eyes may be read directly from the trial lenses without any necessity of compensating by subtraction of the power of the working lenses and another source of possible error is avoided.

In the construction shown in Figure 5, 10 is a frame provided with a bifurcation 11, and having a pair of openings adapted to receive working lenses 12, and being formed on its front edge with a pair of angular supports receiving reflectors or mirrors 13, said parts corresponding in function and effect to the parts described hereinabove. This type of member is particularly adapted for detachable and adjustable support on an optometer, and for this purpose it is provided on its front face with a strap member 14 carrying a forwardly projecting hook portion 15 for engagement with any suitable clamp member carried by an optometer, whereby the entire device may be readily swung from operative to inoperative position or entirely removed. This device functions in all respects in the same manner as the mode of operation hereinabove set forth.

From the above description, it will be apparent that I have described and illustrated a construction embodying all of the features of advantage set forth as desirable, and it is to be understood that I reserve the right to make all change within the spirit of the invention and without the ambit of the prior art.

I claim:—

1. The combination with an optical instrument having trial lenses, a frame adjustably mounted on said instrument, a working lens-holding member carried by said frame and on the opposite side of the trial lenses from a patient, and a reflector carried by said frame for cooperation with the trial lenses to deflect the line of vision when viewed through the trial lenses.

2. The combination with an optical instrument having a pair of trial lenses, a frame adjustably mounted on said instrument, a lens holding member carried by said frame and formed to hold working lenses in parallelism with the trial lenses, and a reflector mounted in the frame and arranged to deflect the line of vision of a patient viewing same through the trial lens.

3. The combination with an optical instrument having a pair of trial lenses, a frame adjustably mounted on said instrument, a pair of lens-holding pockets on said frame, and a reflector carried by said frame and interposed between the pockets thereof and the trial lenses and below the optical center of the latter and arranged to deflect the line of vision of a patient viewing same through the trial lenses.

4. An eye testing device comprising a suitably supported trial lens, a frame formed with a pocket to receive a working lens and maintain it in parallelism to the trial lens, and a reflecting surface formed on said frame to be interposed between the trial and working lenses to deflect the line of vision of a patient when viewing the reflecting surface through the trial lens.

ISAAC NEWTON CASSITY.